(12) United States Patent
Lin

(10) Patent No.: US 8,599,255 B2
(45) Date of Patent: Dec. 3, 2013

(54) VIDEO SURVEILLANCE SYSTEM BASED ON GAUSSIAN MIXTURE MODELING WITH TWO-TYPE LEARNING RATE CONTROL SCHEME

(75) Inventor: Horng-Horng Lin, Zhudong Township, Hsinchu County (TW)

(73) Assignee: Qnap Systems, Inc., New Taipei (TW)

( * ) Notice: Subject to any disclaimer, the term of this patent is extended or adjusted under 35 U.S.C. 154(b) by 457 days.

(21) Appl. No.: 12/961,497

(22) Filed: Dec. 7, 2010

(65) Prior Publication Data

US 2012/0140066 A1  Jun. 7, 2012

(51) Int. Cl.
*H04N 7/18* (2006.01)

(52) U.S. Cl.
USPC .......................................... 348/143

(58) Field of Classification Search
None
See application file for complete search history.

(56) References Cited

U.S. PATENT DOCUMENTS 6,999,620 B1 * 2/2006 Harville ..................... 382/173
7,103,584 B2 * 9/2006 Lee .............................. 706/14

OTHER PUBLICATIONS

D.-S Lee, Effedtive Gaussian Mixture Learning for Video Backgroung Subtraction ( IEEE Trans. Pattern Anal. Mach. Intell., vol. 27, No. 5, pp. 827-832, 2005.).
C. Stauffer and W.E.L. Grimson, Adaptive background mixture models for real-time tracking (IEEE Conf. Computer Vision and Pattern Recognition, vol. 2, pp. 246-252, 1999.).
Hwann-Tzong Chen et al., "Multi-Object Tracking Using Dynamical Graph Matching," Proceedings of the IEEE Computer Society Conference on Computer Vision and Pattern Recognition, Dec. 2001, pp. II-210-II-217.
Dar-Shyang Lee, "Effective Gaussian Mixture Learning for Video Background Subtraction," IEEE Transactions on Pattern Analysis and Machine Intelligence, vol. 27, No. 5, May 2005, pp. 827-832.
Chris Stauffer et al., "Adaptive background mixture models for real-time tracking," IEEE Computer Society Conference on Computer Vision and Pattern Recognition, Jun. 1999, pp. 246-252.

* cited by examiner

*Primary Examiner* — Joseph Ustaris
*Assistant Examiner* — Jill Sechser
(74) *Attorney, Agent, or Firm* — Jianq Chyun IP Office

(57) ABSTRACT

In the present invention, we identify that such a tradeoff between robustness to background changes and sensitivity to foreground abnormalities can be easily controlled by a new computational scheme of two-type learning rate control for the Gaussian mixture modeling (GMM). Based on the proposed rate control scheme, a new video surveillance system that applies feedbacks of pixel properties computed in object-level analysis to the learning rate controls of the GMM in pixel-level background modeling is developed. Such a system gives better regularization of background adaptation and is efficient in resolving the tradeoff for many surveillance applications.

8 Claims, 3 Drawing Sheets

A block diagram of the proposed, general-purposed video surveillance system.

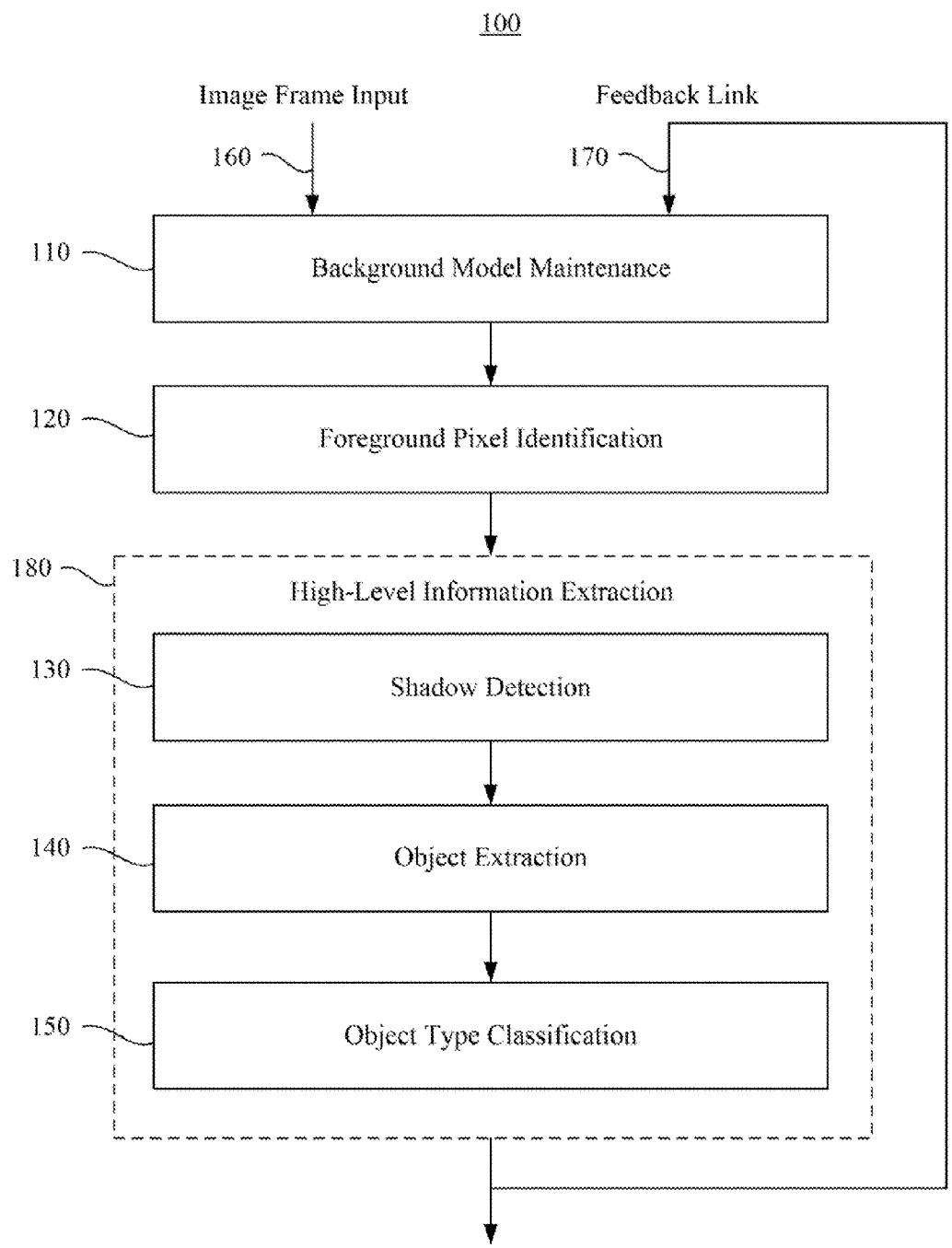
Figure 1 - A block diagram of the proposed, general-purposed video surveillance system.

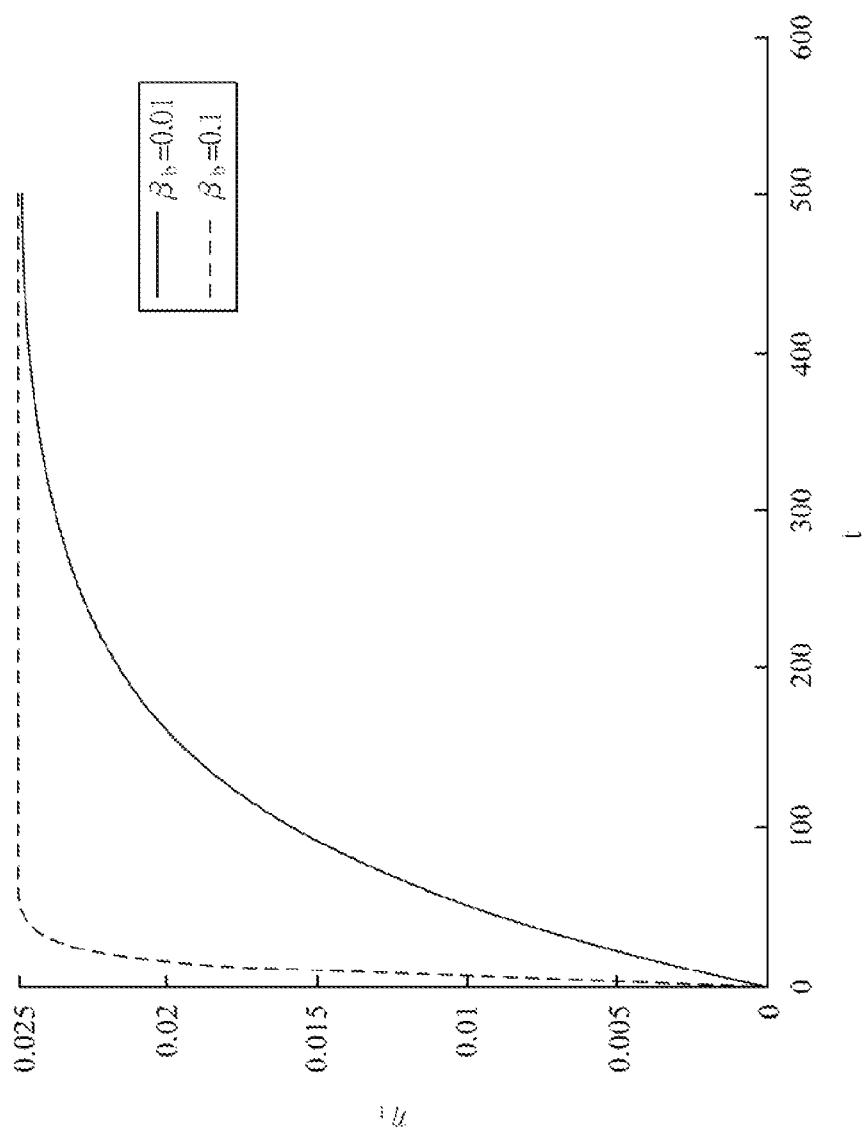
Figure 2 - Simulated changes of the learning rate for a pixel being persistent background

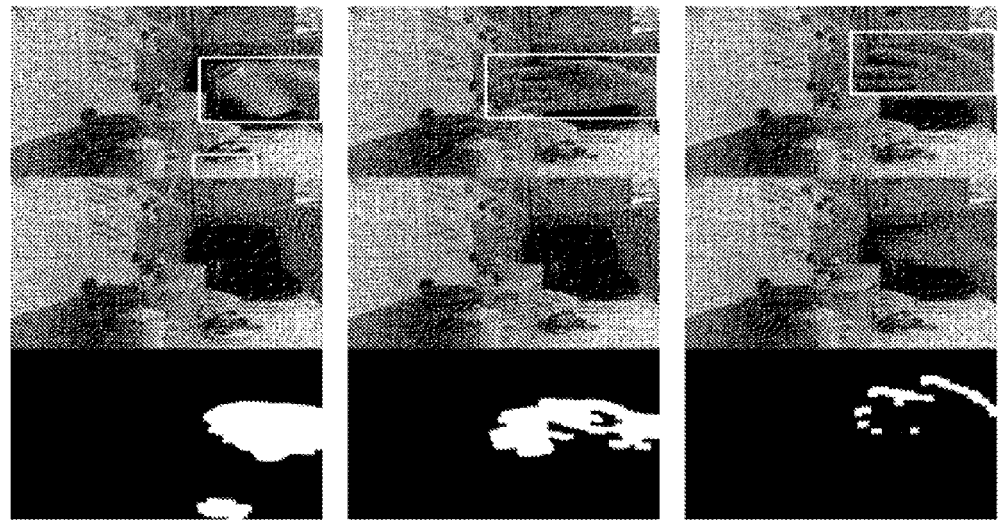
(A) Compared results for $I_{85}$  (B) Compared results for $I_{110}$  (C) Compared results for $I_{150}$
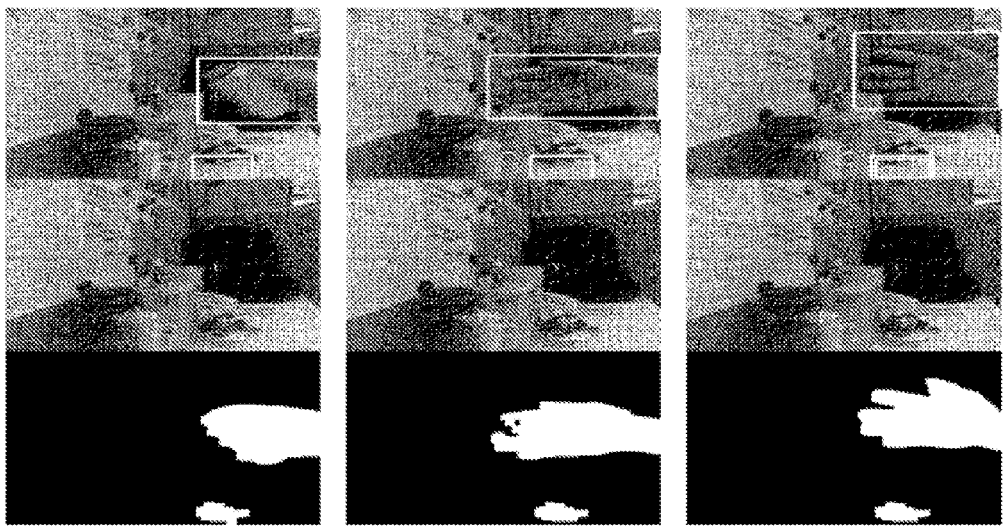
(D) Our results for $I_{85}$  (E) Our results for $I_{110}$  (F) Our results for $I_{150}$
Figure 3 - Experimental image sequence $I$ with scenarios of missing object and waving hand.

VIDEO SURVEILLANCE SYSTEM BASED ON GAUSSIAN MIXTURE MODELING WITH TWO-TYPE LEARNING RATE CONTROL SCHEME

REFERENCES

H.-T. Chen, H.-H. Lin, and T.-L. Liu, *Multi-object Tracking Using Dynamical Graph Matching*, in Proc. IEEE Conf. Computer Vision and Pattern Recognition, vol. 2, pp. 210-217, 2001.

M. Harville, Segmenting Video Input Using High-Level Feedback, U.S. Pat. No. 6,999,620 B1, February 2006.

D.-S. Lee, Adaptive Mixture Learning in a Dynamic System, U.S. Pat. No. 7,103,584 B2, September 2006.

D.-S. Lee, *Effective Gaussian Mixture Learning for Video Background Subtraction*, IEEE Trans. Pattern Anal. Mach. Intell., Vol. 27, No. 5, pp. 827-832, 2005.

C. Stauffer and W. E. L. Grimson, *Adaptive background mixture models for real-time tracking*, in Proc. IEEE Conf. Computer Vision and Pattern Recognition, Vol. 2, pp. 246-252, 1999.

BACKGROUND

The present invention relates generally to the design of a video surveillance system rooted in the Gaussian mixture modeling for background subtraction-based applications. More particularly, the present invention relates to a novel computational scheme of two-type learning rate control for the Gaussian mixture modeling, wherein high-level feedbacks of pixel properties are applied to the adaptive adjustments of the learning rates.

For video surveillance using static camera, background subtraction is often regarded as an effective and efficient method for differentiating foreground objects from a background scene. The performance of background subtraction highly depends on how a background scene is modeled. Ideally, an ideal design of background modeling should be able to tolerate various background variations without losing the sensitivity in detecting abnormal foreground objects. However, the tradeoff between model robustness and model sensitivity is commonly encountered in practice and is hard to be balanced within a single background modeling framework.

Among various background modeling approaches, the Gaussian mixture modeling (GMM), proposed by C. Stauffer and W. E. L. Grimson, *Adaptive background mixture models for real-time tracking*, in Proc. IEEE Conf. Computer Vision and Pattern Recognition, Vol. 2, pp. 246-252, 1999, is known to be effective in sustaining background variations, e.g., waving trees, due to its use of multiple buffers to memorize scene states. It is hence widely adopted as a base framework in many later developments, e.g., M. Harville, Segmenting Video Input Using High-Level Feedback, U.S. Pat. No. 6,999,620 B1, February 2006, and D.-S. Lee, Adaptive Mixture Learning in a Dynamic System, U.S. Pat. No. 7,103,584 B2, September 2006. However, the GMM often suffers from the tradeoff between model robustness to background changes and model sensitivity to foreground 20 abnormalities, abbreviated as R-S tradeoff. For instance, a Gaussian mixture model being tuned to tolerate quick changes in background may also adapt itself to stationary objects, e.g., unattended bags left by passengers, too quickly to issue reliable alarms. The lack of a simple and flexible way to manage the R-S tradeoff for various scenarios motivates this invention.

In the GMM formulations, every image pixel, regardless of its intensity being changing or not, is given the same setting of learning rates in background model estimation, which is inefficient in managing the R-S tradeoff. (The definition of learning rate is inherited from C. Stauffer and W. E. L. Grimson, *Adaptive background mixture models for real-time tracking*, in Proc. IEEE Conf. Computer Vision and Pattern Recognition, Vol. 2, pp. 246-252, 1999, and will be specifically defined later.) Considering a pixel of background that was just uncovered from occlusion of a moving object, the corresponding Gaussian mixture model for this pixel should be updated in a slower pace than that for a stable background pixel, to prevent false inclusion of moving shadows or motion blurs into background. Nonetheless, in the original GMM formulations, an identical learning rate setting is applied to all image pixels, leaving no space for tuning the background adaptation speeds for this case. We therefore highlight the importance of adaptive learning rates control in space and in time, and propose a new video surveillance system with a novel learning rate control scheme for the GMM.

In the present invention related to a new learning rate control scheme for the GMM, high-level feedbacks of pixel properties are applies to adaptive adjustments of the learning rates in space and in time. Despite that the idea of adopting high-level feedbacks, such as foreground pixel type, in background modeling is not new, e.g., M. Harville, Segmenting Video Input Using High-Level Feedback, U.S. Pat. No. 6,999,620 B1, February 2006, to the best of our knowledge, the proposed learning rate control scheme is the first to utilize two types of learning rate controls for enhancing the model estimation accuracy and regularizing the R-S tradeoff simultaneously. In the present invention, high-level feedbacks are applied only to the learning rate control related to the R-S tradeoff, but not to the other related to the model estimation accuracy, which leads to a unique design of a robust surveillance system.

SUMMARY

The present invention proposes a new design of a video surveillance system based on the GMM. Particularly, the present invention addresses a novel learning rate control scheme for the GMM, wherein two types of learning rates are adopted and high-level feedbacks of pixel types are used for adaptive adjustments of learning rate settings. With the present invention of a surveillance system design, the inherent tradeoff between model robustness to background changes and model sensitivity to foreground abnormalities for the GMM can be effectively and efficiently regularized for various needs in video surveillance.

New features of the present invention are in three folds. Firstly, two types of learning rates are adopted in a Gaussian mixture model, one for controlling the model estimation accuracy and the other for regularizing the R-S tradeoff. Different from the general GMM formulations that use a single learning rate setting for both the learning needs, the present invention distinguishes two different types of learning rates and manipulates them independently. Secondly, the background adaptation rate for each image pixel is set individually in space. Image pixels at different locations may thus exhibit distinct behaviors in background adaptation for accommodating local scene changes. Thirdly, for every image pixel, its learning rate for regularizing the R-S tradeoff is computed based on the high level feedback of its latest pixel type, e.g., as background, stationary foreground, moving foreground, etc. Under this feedback control, the learning rate setting for an image pixel can be dynamically adjusted in time, according to the feedback type, and with respect to different application scenarios.

BRIEF DESCRIPTION OF THE DRAWINGS

FIG. 1 shows a block diagram of the proposed, general-purposed video surveillance system in an embodiment of the present invention;

FIG. 2 shows the simulated changes of the learning rate $\eta_t$ for a pixel being persistent background, given $\beta_b$=0.01 (solid line) and $\beta_b$=0.1 (dotted line), respectively, where the initial learning rate $\eta_{t=0}$ is set to $\frac{1}{6000}$ and $\eta_b$ is set to 0.025; and FIG. 3 shows experimental comparisons of D.-S. Lee, *Effective Gaussian Mixture Learning, for Video Background Subtraction*, IEEE Trans. Pattern Anal. Mach. Intell., Vol. 27, No. 5, pp. 827-832, 2005, and the present invention with experimental scenarios of missing object and waving hand. Top row: foreground detection results; middle row: background maps; bottom row: foreground maps. While FIGS. 3(A)-(C) are the compared results, FIGS. 3(D)-(F) are ours. In FIG. 3(F), the cellular phone taken away is identified as missing object and enclosed by a double box.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts. It is also to be understood that the detail description of the present embodiments is by examples and is intended to provide further explanation of the invention as claimed.

A. Model Accuracy, Robustness and Sensitivity

To estimate a density distribution from a sequence of intensities $I_{0,x}, \ldots, T_{t,x}$ for an image pixel at a position x via GMM, three issues regarding model accuracy, robustness and sensitivity need to be addressed. (Here $I_{t,x} \in \Re$ denotes the 1-D pixel intensity. Yet, all our formulations can be easily extended to multi-dimensional color image processing.) Specifically, a mixture model consisting of N Gaussian distributions at time instance t can be denoted by $$P(I_{t,x}) = \sum_{n=1}^{N} w_{t-1,x,n} N(I_{t,x}; \mu_{t-1,x,n}, \sigma^2_{t-1,x,n}),$$

where N symbolizes a Gaussian probability density function, $\mu_{t-1,x,n}$ and $\sigma^2_{t-1,x,n}$ are the Gaussian parameters of the nth model, and $w_{t-1,x,n}$ is the respective mixture weight. For maintaining this mixture model, the parameters $\mu_{t-1}$, $\sigma^2_{t-1}$ and $w_{t-1}$ need to be updated based on a new observation $I_{t,x}$. In general GMM formulations, e.g., D.-S. Lee, Adaptive Mixture Learning in a Dynamic System, U.S. Pat. No. 7,103,584 is B2, September 2006, the update rules for the case that $I_{t,x}$ matches the nth Gaussian model are $$\mu_{t,x,n} = (1 - \rho_{t,x,n}(\alpha))\mu_{t-1,x,n} + \rho_{t,x,n}(\alpha)I_{t,x} \quad (1)$$

$$\sigma^2_{t,x,n} = (1 - \rho_{t,x,n}(\alpha))\sigma^2_{t-1,x,n} + \rho_{t,x,n}(\alpha)(I_{t,x} - \mu_{t,x,n})^2 \quad (2)$$

$$w_{t,x,n} = (1 - \alpha)w_{t-1,x,n} + \alpha \quad (3)$$

where $\rho_{t,x,n}(\alpha)$ and $\alpha$, both in [0,1], are learning rates that control how fast the estimates $\mu$, $\sigma^2$ and w converge to new observations. In C. Stauffer and W. E. L. Grimson, *Adaptive background mixture models for real-time tracking*, in Proc. IEEE Conf. Computer Vision and Pattern Recognition, Vol. 2, pp. 246-252, 1999, the relationship between the two learning rates $\rho$ and $\alpha$ is defined as $$\rho_{t,x,n}(\alpha) = \alpha N(I_{t,x}; \mu_{t-1,x,n}, \sigma^2_{t-1,x,n})$$

while in D.-S. Lee, Adaptive Mixture Learning in a Dynamic System, U.S. Pat. No. 7,103,584 B2, September 2006, a variant is given by $$\rho_{t,x,n}(\alpha) = \left(\frac{1-\alpha}{t+1} + \alpha\right) \quad (4)$$

From the two definitions of $\rho$, one can see that $\alpha$ is actually the only parameter that controls the convergence speeds for all the three update rules regarding $\mu$, $\sigma^2$ and w.

In updating the Gaussian parameters $\mu$ and $\sigma^2$, their values should reflect the up-to-date statistics of a scene as accurately as possible. It is thus preferable to set their learning rates to large values to quickly derive Gaussian distributions that fit new observations. As also noted in D.-S. Lee, *Effective Gaussian Mixture Learning for Video Background Subtraction*, IEEE Trans. Pattern Anal. Mach. Intell., Vol. 27, No. 5, pp. 827-832, 2005, using (4) gives a higher learning rate $\rho$ of at the beginning of the GMM estimation process, and improves model accuracy in estimating $\mu$ and $\sigma^2$.

While the model estimation accuracy depends on the learning rates for the Gaussian parameters $\mu$ and $\sigma^2$, the model robustness and sensitivity, as identified by the present invention, are affected by the learning rate for the mixture weight w. In the GMM, the classification of Gaussian models (for an image pixel) into foreground and background is done by evaluating their mixture weights through thresholding. The Gaussian models that appear more often will receive larger weights in the model updating process via (3), and will possibly be labeled as background. However, we notice that the frequency of model occurrence should not be the only factor that guides the changes of the mixture weights. For example, one may prefer to give large weights to the Gaussian models of tree shadows (for background adaptation) while to keep small weights to those of stopped cars (for foreground detection), despite the similar frequencies of occurrence of these two stilt objects. Using the weight update rule (3) with simply a constant learning rate $\alpha$ fails to fulfill such needs of adaptive tuning model weights, and leads to difficulties in the regularization of the R-S tradeoff.

Unlike general GMM-based background modeling approaches that applies a shared parameter $\alpha$ to the updating of all the three estimates $\mu$, $\sigma^2$ and w, we instead propose to separate the learning rate for the Gaussian parameters ($\mu$ and $\sigma^2$) from that for the mixture weight (w). In contrast with (3), a new update rule for w is given by $$w_{t,x,n} = (1-\eta_{t,x}(\beta))w_{t-1,x,n} + \eta_{t,x}(\beta),$$

where $\eta_{t,x}(\beta) \in [0,1]$ is a new learning rate introduced for the updating of the mixture weight. Now, we have two scalars $\alpha$ and $\beta$ acting as hyper-parameters over the two types of learning rates $\rho(\alpha)$ and $\eta(\beta)$, respectively, for tuning, their values. By introducing the two independent learning rates $\rho(\alpha)$ and $\eta(\beta)$ into the GMM, the controls of the model accuracy and the R-S tradeoff can be decoupled, which makes the simultaneous fulfillments of speedy model convergence and R-S tradeoff regularization possible.

Furthermore, the high-level information, e.g., the pixel types of shadow or car, can be imposed on the settings of $\eta_{t,x}(\beta)$s at different pixel locations and time instances. For example, if an image pixel at x is detected as shadow- (car-) type at the time instance t, the corresponding learning rate $\eta_{t,x}$ can be set to a large (small) value for quick (slow) background adaptation. As more pixel types are designated by a surveillance system, more appropriate controls on weight changes are able to be advised accordingly, which will help resolving the R-S tradeoff in background modeling. Besides, the model estimation accuracy will not be affected by such adaptive learning rate tuning due to the separation of the learning rate $\rho$ from $\eta$.

B. Background Model Maintenance

Before addressing the whole design of the proposed surveillance system, one of the system modules, background model maintenance, that embodies the two-type learning rate control scheme is detailed first. Given a new observation of pixel intensity $I_{t,x}$, the task of background model maintenance is to match this new observation to existing Gaussian distributions, if possible, and to renew all the parameters of the Gaussian mixture model for this pixel. The detailed steps of background model maintenance based on the GMM for the design of a surveillance system is shown in Algorithm 1.

---

Algorithm 1: Background model maintenance

Given: $T_\sigma$, $\sigma_0^2$, $w_0$
// Model matching
$M_{t,x,n} = 0$, $\forall n = 1, \ldots, N$
$d_{t,x,n} = \inf$, $\forall n = 1, \ldots, N$
for $n = 1, \ldots, N$ do
    if $|I_{t,x} - \mu_{t-1,x,n}| \le T_\sigma \sigma_{t-1,x,n}$ then $d_{t,x} = -w_{t-1,x,n}$
$l(t, x) = \arg\min_{n=1,\ldots,N} d_{t,x,n}$
If $d_{t,x} \ne \inf$ then $M_{t,x,l(t,x)} = 1$ else $l(t, x) = 0$
// Model maintenance
$w_{t,x,n} = (1 - \eta_{t,x}(\beta))w_{t-1,x,n} + \eta_{t,x}(\beta)M_{t,x,n}$, $\forall n$
If $M_{t,x,n} = 1$ then
    // Update phase
    $\rho_{t,x,l(t,x)}(\alpha) = \alpha N(I_{t,x}; \mu_{t-1,x,l(t,x)}, \sigma_{t-1,x,l(t,x)}^2)$
    $u_{t,x,l(t,x)}(\alpha) = (1 - \rho_{t,x,l(t,x)}(\alpha)) u_{t-1,x,l(t,x)} + \rho_{t,x,l(t,x)} I_{t,x}$
    $\sigma_{t,x,l(t,x)}^2(\alpha) = (1 - \rho_{t,x,l(t,x)}(\alpha)) \sigma_{t-1,x,l(t,x)}^2 + \rho_{t,x,l(t,x)} (I_{t,x} - u_{t,x,l(t,x)})^2$
else
    // Replacement phase
    $k = \arg\min_{n=1,\ldots,N} w_{t-1,x,n}$
    $u_{t,x,k} = I_{t,x}$
    $\sigma_{t,x,k}^2 = \sigma_0^2$
    $w_{t,x,k} = w_0$ $w_{t,x,n} = w_{t,x,n} / \sum_{n=1}^{N} w_{t,x,n}$, $\forall n$

---

In Algorithm 1, a weight-based mulching rule $$l(t, x) = \operatorname*{argmin}_{n=1,\ldots,N} d_{t,x,n}, \text{ subject to}$$

$$d_{t,x,n} = \begin{cases} -w_{t-1,x,n} & \text{if } |I_{t,x} - \mu_{t-1,x,n}| \le T_\sigma \sigma_{t-1,x,n} \\ \inf & \text{otherwise} \end{cases}$$

is proposed, where $l(t,x)$ indexes the best matched Gaussian model of $I_{t,x}$ and $T_\sigma$ is a given threshold. This computationally efficient matching rule matches a pixel observation to the Gaussian model with the highest weight, if this observation falls in the scopes of multiple models. However, if $d_{t,x,n} = \inf$ holds for all $\eta_s$, which implies no model is matched for the pixel observation $I_{t,x}$, the index will $l(t,x)$ be rest to 0 to signify $I_{t,x}$ is a brand-new observation and should be modeled by a new in Gaussian distribution. The matching results of $I_{t,x}$ can be recorded by model matching indicators $$M_{t,x,n} = \begin{cases} 1 & \text{if } n = l(t, x), \\ 0 & \text{otherwise,} \end{cases}$$

for $n = 1, \ldots, N$ and will be used in the later model update.

After model matching, we check if $M_{t,x,l(t,x)}$ is equal to 0, which implies no model matched. If so, a model replacement is performed to incorporate $I_{t,x}$ into GMM; otherwise, a model update is executed. In the replacement phase, the least weighted Gaussian model is replaced by the current intensity observation. In the update phase, the two-type learning rate control scheme for updating estimates $\mu$, $\sigma^2$ and $w$ are applied. Note that we choose (3) as the default setting for the learning rate $\rho$. Regarding the computation of the learning rate $\eta_{t,x}$, we link it to the high-level feedback of pixel types, as will be elaborated in the presentation of our surveillance system design.

C. Video Surveillance System with High-Level Feedback for Learning Rate Control

A block diagram of an example embodiment of the proposed, general-purposed video surveillance system 100 is illustrated in FIG. 1, where the processing modules are presented in a sequential manner. The image frame input 160 of the video surveillance system 100 can be generated by a digital camera or a digital image capture device. The module of background model maintenance 110 corresponds to the Algorithm 1. The second one of foreground pixel identification 120 distinguishes foreground pixels from background ones based on the computed background model. The rest three (real) modules of shadow detection 130, object extraction 140, and object type classification 150, which can be enclosed by the (abstract) module of high-level information extraction 180, further classifies foreground pixels into the types of shadow, still foreground and moving foreground, based on object-level analysis. The final output of high-level information that characterizes pixel types is fed back to the first module of background model maintenance 110 via a feedback link 170 for further control of the learning rates.

In the GMM, all the scene changes, no matter foreground or background, are modeled by Gaussian distributions. To further distinguish these two classes, as what is done by the second module of foreground pixel identification 120, a foreground indicator $F_{t,x,n}$ for the nth Gaussian distribution (of the N Gaussian models) is defined using the mixture weight thresholding as $$F_{t,x,n} = \begin{cases} 0 & \text{if } w_{t,x,n} \ge T_w, \\ 1 & \text{otherwise,} \end{cases}$$

where $T_w \in \Re$ is a preset parameter. A binary foreground map can then be defined as a set $F_t = \{F_{t,x,l(t,x)} | \forall x\}$, which also acts as the output of the foreground pixel identification module 120. Note that, comparing with C. Stauffer and W. E. L. Grimson, *Adaptive background mixture models for real-time tracking*, in Proc. IEEE Conf. Computer Vision and Pattern Recognition, Vol. 2, pp. 246-252, 1999, that sorts the N Gaussian models by the values of w/σ first and selects the background ones from a sorted model queue by thresholding the values of w/σ again, the adopted mixture weight thresholding is simpler in computation, has less complication in foreground pixel labeling, and more fits the proposed weight-based matching vile.

The third module of shadow detection 130 can be realized by general shadow detection algorithms, e.g., the one used in H.-T. Chen, H.-H. Lin, and T.-L. Liu, *Multi-object Tracking Using Dynamical Graph Matching*, in Proc. IEEE Conf. Computer Vision and Pattern Recognition, vol. 2, pp. 210-217, 2001. The shadow detection module 130 takes the foreground map from the foreground pixel identification module 120 as its input, checks the foreground pixels, and identifies the shadow pixels among them. In the fourth module of object extraction 140, we group the foreground pixels (excluding those of shadow type) into foreground objects by using, e.g., connected component analysis.

As an example embodiment of the present invention, we demonstrate four learning rate settings for four pixel types of background, shadow, still foreground and moving foreground, respectively. Based on the proposed system design shown in FIG. 1, the pixel types of background, shadow and foreground can be easily discriminated. To further classify the foreground type into still and moving ones, an object tracking algorithm presented in H.-T. Chen, H.-H. Lin, and T.-L. Liu, *Multi-object Tracking Using Dynamical Graph Matching*, in Proc. IEEE Conf. Computer Vision and Pattern Recognition, vol. 2, pp. 210-217, 2001, can be adopted by the fifth module of object type classification 150 to find the temporal associations among objects of time instances t and t−1. Then, the position displacements of tracked objects are thresholded for discrimination of still and moving types. Thus, a pixel type indicator for every pixel at time instance t can be defined as $$O_{t,x} = \begin{cases} 0 & \text{if } F_{t,x,l(t,x)} = 0, \text{ (Background)} \\ 1 & \text{if } F_{t,x,l(t,x)} = 1 \text{ and Type}(I_{t,x}) = \text{Shadow}, \\ 2 & \text{if } F_{t,x,l(t,x)} = 1 \text{ and Type}(I_{t,x}) = \text{Still foreground}, \\ 3 & \text{Otherwise. (Moving foreground)} \end{cases}$$

A pixel type map, being as the output of the object type classification module 150, can then be denoted by $O_t = \{O_{t,x} | \forall x\}$.

Subsequently, the pixel type map $O_t$ is sent to the background model maintenance module 110 via the feedback link 170 for the learning rate control at the next time instance. With the above notations, the learning rate $\eta_{t,x}$ can now be specified by $$\eta_{t,x}(\beta) = \begin{cases} (1-\beta_b)\eta_{t-1,x} + \eta_b\beta_b & \text{if } O_{t-1,x} = 0, \\ \beta_d N(I_{t,x}; \mu_{t-1,x,b(t,x)}, \sigma^2_{t-1,x,b(t,x)}) & \text{if } O_{t-1,x} = 1, \\ \beta_s & \text{if } O_{t-1,x} = 2, \\ \beta_m & \text{if } O_{t-1,x} = 3 \end{cases} \quad (5)$$

where $\eta_b$ is a preset constant, the hyper-parameter $\beta = [\beta_b \beta_d \beta_s \beta_m]^T \in \mathfrak{R}^4$ is extended to a vector for regularizing the learning rate with respect to different pixel types, and the index of the most probable background model, b(t,x), is defined by $$b(t, x) = \underset{n=1,\ldots,N}{\operatorname{argmax}} w_{t,x,n}$$

Owing to that the feedback control is applied to the learning rate $\eta_{t,x}$, but not to the mixture weights $w_{t,x,n}$ directly, dramatic changes in mixture weights as pixel type varies can be avoided. Stable foreground and background separation via weight thresholding can thus be obtained.

For a pixel of moving foreground ($O_{t-1,x}=3$), one may set $\beta_m \approx 0$ to suppress the adaptation of all moving objects into background, resulting in a very sensitive system to motions. In contrast, by setting $\beta_m$ to a large value, which results in a quick increase of the weight of a Gaussian model for, say, a waving tree, a system will be more capable of tolerating background variations. On the other hand, for the type of still foreground, the larger the $\beta_S$ is set, the quicker a stationary object will be merged into background. For the application of abandoned and missing object detection, a small $\beta_S$ is preferred. Regarding the case of shadow type, we favor faster adaptation of fainter shadows into background, so N(·) is used to estimate the similarity between the shadow intensity and the Gaussian model of the most probable background (indexed by $b_{t,x}$). The corresponding learning rate is then set to the similarity measure multiplied by a regularization scalar $\beta_d$.

For a pixel of background type, i.e., $O_{t-1,x}=0$, its learning rate is designed to be gradually increased at a rate regularized by $\beta_b$, as formulated in (5). The learning rate for an image pixel being persistently identified as background will asymptotically approach $\eta_b$, as shown in FIG. 2. However, once this pixel position being occluded by shadows or moving objects, the respective learning rate will be reset to other value, e.g., $\beta_m$, that is much smaller than it was used to be. This design helps preventing false inclusion of afterimages left by moving objects into background. When taking pictures of moving objects, their boundaries are often in blur. Some motion-blurred regions near object boundaries may be misclassified as background, resulting in afterimages. For an object hovering over a region, its afterimages appear frequently and will be quickly included into a background model. To alleviate such a problem, instead of setting the learning rate to a constant, i.e., $$\eta_{t,x} = \eta_n, \text{ if } O_{t-1,x} = 0, \quad (6)$$

it is increased gradually for a pixel of background in the proposed approach.

In our experiments, we set $\eta_b = \alpha$, $\beta_b = 0.01$, $\beta_d = 1/100$, $\beta_S = 1/900$ and $\beta_m = 1/6000$ as default values. Further, $\alpha = 0.025$ is chosen for the adaptation of quick lighting changes for general surveillance conditions. To visualize the derived background models, a definition of background map $\beta_t = \{\mu_{t,x,b(t,x)} | \forall x\}$ is employed in resulting figures of experiments.

As shown in FIG. 3(A), a cellular phone on a desk is taken away. Usually, a missing personal property should be marked as foreground and trigger an alarm. However, such an abnormal event can not be stably detected, as shown in FIG. 3(B), by using the method of D.-S. Lee, *Effective Gaussian Mixture Learning for Video Background Subtraction*, IEEE Trans. Pattern Anal. Mach. Intell., Vol. 27, No. 5, pp. 827-832, 2005, with α=0.025, due to the high learning rate setting. With α=0.025 for the compared approach, quick lighting changes of a scene as well as uncovered regions from missing objects will be quickly adapted into a background model, which leaves no reliable evidence for the detection of missing object. Similarly, hand waving in front of the camera is soon adapted into background as well, as shown in FIG. 3(C), causing the hand regions only partially detected. In contrast, these scenarios of quick lighting change, missing object, and periodic motion, can be properly handled by the proposed approach with the same parameter setting (α=0.025), as shown in FIGS. 3(D)-(F). Thanks to the feedback control of the learning rate η, these scenarios can all be modeled decently in an unified framework.

To sum up, the invented learning rate control scheme for the GMM roots in the high level feedback of pixel types identified by the proposed, general-purposed video surveillance system. Although, in the example embodiment, only a limited amount of pixel types are introduced in the learning rate control scheme, noticeable improvements in foreground detection over general GMM approaches are already observable. Owing to the scalability of the video surveillance system with a two-type learning rate control scheme, more complex scenarios may be handled with more high-level information incorporated. For example, region-level classification results of skin/non-skin, face/non-face and human/non-human can be fed into the learning rate control of η in the proposed system design to increase model sensitivity to these objects. Moreover, users can assign pixel types of particular image locations, in real-time and/or prior to system processing, to increase their background adaptation rates to waving trees or to enhance foreground detection sensitivity of forbidden zones.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A video surveillance system based on Gaussian mixture modeling with a two-type learning rate control scheme comprising:
   a processor configured to execute at least three processing modules, stored in an non-transitory storage medium, of:
   a background model maintenance module that constructs a background model as its module output from an image frame input, based on the Gaussian mixture modeling with a two-type learning rate control scheme;
   a foreground pixel identification module that marks a plurality of pixels of a current image frame of the plurality of image frames as foreground or background, and generates a foreground map as its output; and
   a high-level information extraction module that classifies the foreground pixels into a plurality of object level types via foreground object analysis; and
   at least two links of:
   an input link of the plurality of image frames; and
   a feedback link of high-level information that is generated by the high-level information extraction module and transmitted to the background model maintenance module,
   wherein the background model maintenance module being operated to perform steps of:
   receiving one of the plurality of image frames It;
   matching each pixel intensity It,x to one of N Gaussian models of a corresponding Gaussian mixture model, based on a weight-based model matching rule, $$l(t, x) = \underset{n=1,\ldots,N}{\operatorname{argmin}} d_{t,x,n}, \text{ subject to}$$

$$d_{t,x,n} = \begin{cases} -w_{t-1,x,n} & \text{if } |I_{t,x} - \mu_{t-1,x,n}| \leq T_\sigma \sigma_{t-1,x,n} \\ \inf & \text{otherwise} \end{cases},$$

where l(t,x) indexes the best matched Gaussian model, if existing, for $I_{t,x}$, the three parameters, $\mu_{t-1,x,n}$, $\sigma_{t-1,x,n}$, and $w_{t-1,x,n}$, denote the mean, standard deviation and mixture weight, respectively, of the nth Gaussian distribution of the Gaussian mixture model, and $T_g$ is a given threshold;
   applying the two-type learning rate control scheme to the updating of the Gaussian mixture model, wherein two independent learning rates, $\rho_{t,x}$ and $\eta_{t,x}$, are adopted by the iterative updating rules of the Gaussian parameters (μ and σ) and of the mixture weight (w), respectively, for the Gaussian mixture model of the location x at the current time instance t; and
   producing the Gaussian mixture background model at the current time instance t as the module output.

2. The video surveillance system of claim 1, wherein the foreground pixel identification module being operated to perform steps of:
   receiving the Gaussian mixture background model at the current time instance t;
   marking each image pixel as foreground or background by the mixture weight thresholding, $$F_{t,x} = \begin{cases} 0 & \text{if } w_{t,x,l} \geq T_w, \quad \text{(Background)} \\ 1 & \text{otherwise,} \quad \text{(Foreground)} \end{cases}$$

wherein $F_{t,x}$ is a binary, foreground/background indicator for a pixel located at x at the time instance t, is the mixture weight of the l(t,x)th Gaussian model matching the image intensity $I_{t,x}$ and $T_w$ is a given weight threshold; and
   producing a foreground map $F_t = \{F_{t,x} | \forall x\}$ at the current time instance t as its module output, wherein the foreground map $F_t$ is a set of foreground/background indicators $F_{t,x}$s for all pixel locations xs.

3. The video surveillance system of claim 2, wherein the high-level information extraction module being operated to perform steps of:
   receiving the foreground map $F_t$ at the current time instance t;
   deriving a general-purposed pixel type indicator $O_{t,x}$ for each of the image pixels via manual specification and/or automatic pixel type analysis;
   producing a pixel type map $O_t = \{O_{t,x} | \forall x\}$ at the current time instance as its module output, wherein the pixel, type map $O_t$ is a set of pixel type indicators $O_{t,x}$s for all pixel locations xs; and
   feeding the derived high-level information comprising the pixel type map back to the background model maintenance module.

4. The video surveillance system of claim 1, wherein the learning rate $\eta_{t,x}$ for regularizing the updating speed of mixture weight, for a pixel located at x at the time instance t, in the two-type learning rate control scheme is designed as an independent rate control from the other learning rate $\rho_t$, for regularizing the updating speed of Gaussian parameters.

5. The video surveillance system of claim 1, wherein the learning rate $\eta_{t,x}$ for regularizing the updating speed of mixture weight, for a pixel located at x at the time instance t, in the two-type learning rate control scheme can be
   correlated to the high-level information of pixel type computed at previous time instances; and defined as a function $\eta(\beta)$ that adopts a parameter $\beta$ in a form of scalar, vector or matrix as its function argument for controlling its value.

6. The video surveillance system of claim 3, wherein general-purposed pixel type indicator $O_{t,x}$ generated by the high-level information extraction module for the learning rate control of the Gaussian mixture modeling can be further specified as:

two types of foreground and background for the basic learning rate control for the Gaussian mixture modeling;

four commonly-seen types of background, shadow, still foreground, and moving foreground that can be specifically denoted by $$O_{t,x} = \begin{cases} 0 & \text{if Type}(I_{t,x}) = \text{Background} \\ 1 & \text{if Type}(I_{t,x}) = \text{Shadow}, \\ 2 & \text{if Type}(I_{t,x}) = \text{Still foreground}, \\ 3 & \text{if Type}(I_{t,x}) = \text{Moving foreground} \end{cases}$$

for four-class learning rate control for the Gaussian mixture modeling; and user-assigned types for some image locations in real-time system processing or prior to system processing.

7. The video surveillance system of claim 5, wherein the learning rate control of $\eta_{t,x}$ being correlated to the high-level information of the pixel type of location x at the time instance t can be explicitly formulated as plural number of rate control sub-equations corresponding to different assignments of the pixel type indicator $O_{t,x}$ for flexible learning rate control.

8. The video surveillance system of claim 7, wherein the learning rate control of $\eta$ being correlated to the four commonly-seen types of background, shadow, still foreground, and moving foreground can be further formulated as $$\eta_{t,x}(\beta) = \begin{cases} (1-\beta_b)\eta_{t-1,x} + \eta_b\beta_b & \text{if } O_{t-1,x} = 0, \\ \beta_d N(I_{t,x}; \mu_{t-1,x,b(t,x)}, \sigma^2_{t-1,x,b(t,x)}) & \text{if } O_{t-1,x} = 1, \\ \beta_s & \text{if } O_{t-1,x} = 2, \\ \beta_m & \text{if } O_{t-1,x} = 3 \end{cases}$$

where $\beta = [\beta_b \beta_d \beta_s \beta_m]^T \in \Re^4$ is the parameter in vector form of the learning rate function $\eta$ for tuning the rate settings of the corresponding pixel types, $\eta_b$ is a preset constant for the rate formulation of the background type, b(t,x) is the index of the most probable background model defined as $$b(t, x) = \underset{n=1,\ldots,N}{\operatorname{argmax}} w_{t,x,n},$$

and $N(\bullet; \mu, \sigma^2)$ is a Gaussian distribution with model mean $\mu$ and standard deviation $\sigma$.

* * * * *